United States Patent [19]
Yoshioka et al.

[11] Patent Number: 5,811,683
[45] Date of Patent: Sep. 22, 1998

[54] METHOD AND APPARATUS FOR LOCATION OF ANOMALOUS SIGNAL IN A RADIAL BEARING

[75] Inventors: Takeo Yoshioka, Ushiku; Atsushi Korenaga, Tsukuba, both of Japan

[73] Assignee: Agency of Industrial Science & Technology, Ministry of International Trade & Industry, Tokyo, Japan

[21] Appl. No.: 832,362

[22] Filed: Apr. 2, 1997

[30] Foreign Application Priority Data

Apr. 4, 1996 [JP] Japan .................................. 8-108326

[51] Int. Cl.$^6$ .................................................. G01N 29/04
[52] U.S. Cl. ................................ 73/660; 73/587; 73/488; 324/207.25
[58] Field of Search ............................. 73/649, 660, 587, 73/488; 324/207.25

[56] References Cited

U.S. PATENT DOCUMENTS

| | | | |
|---|---|---|---|
| 4,669,315 | 6/1987 | Sato et al. | ................................. 73/660 |
| 4,991,442 | 2/1991 | Matsumoto | ................................. 73/660 |
| 5,142,916 | 9/1992 | Yamaguchi | ................................. 73/587 |
| 5,200,697 | 4/1993 | Adler et al. | ..................... 324/207.22 |

FOREIGN PATENT DOCUMENTS

3-120460  5/1991  Japan .

*Primary Examiner*—Max H. Noori
*Attorney, Agent, or Firm*—Oblon, Spivak, McClelland, Maier & Neustadt, P.C.

[57] ABSTRACT

A method for locating a source position of an anomalous signal in a radial bearing comprises using a signal detection sensor, an inner-ring positional detection sensor for detecting a rotational position of a bearing inner ring, and a ball positional detection sensor for detecting a revolution position of bearing-balls. Signals from the signal detection sensor, inner-ring positional detection sensor, and ball positional detection sensor are used to locate positions of contact between balls and the inner or outer ring at a time of anomalous signal generation, within a load zone, as an anomalous signal source position.

16 Claims, 11 Drawing Sheets

METHOD AND APPARATUS FOR LOCATION OF ANOMALOUS SIGNAL IN A RADIAL BEARING

BACKGROUND OF THE INVENTION

1. Field of the Invention

This invention relates to a method and apparatus for locating the source position of an anomalous signal, acoustic emission (AE), vibration, sounds and the like accompanying rolling bearing failure in an inner or outer ring of a radial bearing, for use in diagnosing radial bearings in service and for explaining the propagation of a crack occurring during a bearing failure.

2. Prior Art Statement

Conventional anomaly detection technology includes measurement of bearing vibration, AE and the like in the detection of bearing abnormalities. These methods of detecting abnormalities involve diagnosing anomalies by focusing only on changes in signals over time. However, although the diagnosis of anomalies requires the assessing of an abnormal condition by accurately locating the position of an anomaly such as a failed rolling bearing, the conventional methods do not accomplish this. One of the present inventors therefore proposed a method (in Japanese Patent Application Disclosure No. HEI-3-120460) of locating the source of a signal indicating an abnormality in a thrust rolling bearing. The proposed technology was a combination of a system of locating the position of an AE signal in the thrust bearing as the position of a ball along a track at the time the AE was generated, with a system of locating the position of an AE based on the time difference it takes for an AE signal to reach a plurality of sensors. The proposed location technology enables the location of an AE source position with high precision. However, the location technology cannot be applied as it is to radial bearings, owing to differences in bearing structure and operation between radial bearings and thrust bearings.

An object of the present invention is to provide a method and apparatus for diagnosing abnormalities in radial bearings that enables anomalous conditions to be accurately grasped and to improve a S/N ratio due to classify a signal corresponding to a position and a signal that does not correspond to a position.

SUMMARY OF THE INVENTION

To attain the above object, the present invention provides a method for locating a source position of an anomalous signal in a radial bearing, comprising use of a signal detection sensor, an inner-ring positional detection sensor for measuring a rotational position of a bearing inner ring, and a ball positional detection sensor for measuring a revolution position of bearing-balls, and the use of signals from the signal detection sensor, inner-ring positional detection sensor, and ball positional detection sensor to locate positions of contact between balls and the inner or outer ring at a time of anomalous signal generation within a load zone as an anomalous signal source position.

To attain the above object, the present invention also provides an apparatus for locating a source position of an anomalous signal, comprising a signal detection sensor, an inner-ring positional detection sensor for measuring a rotational position of a bearing inner ring and a ball positional detection sensor for measuring a revolution position of bearing-balls, the sensors being attached to a housing, and an arithmetic unit for calculating positions of contact between balls and the inner or outer ring at a time of anomalous signal generation within a load zone.

Thus, when there is an anomaly signal, location sensitivity and precision can be improved by locating the signal source as being a point of contact between a ball and the inner or outer ring.

In this specification, hereinbelow anomaly signals caused by AE, vibration, sounds, etc., will be referred to as "AE."

Further features of the invention, its nature and various advantages will be more apparent from the accompanying drawings and following detailed description of the invention.

DESCRIPTION OF THE PREFERRED EMBODIMENT

Details of a preferred embodiment will now be described with reference to the drawings, starting with a description of an apparatus for implementing the method for locating the position of a signal in a radial bearing in accordance with the invention.

Figure 1:
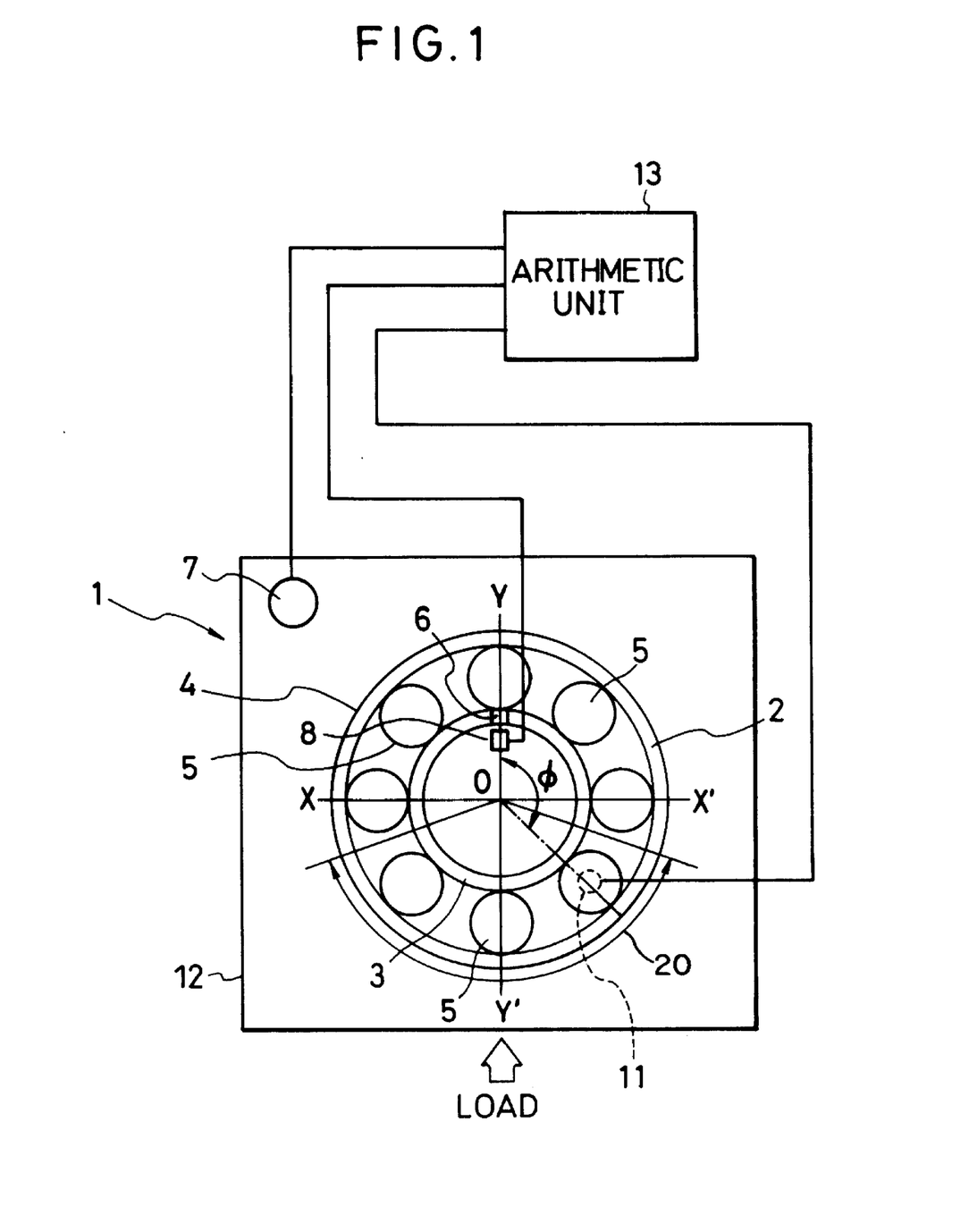
FIG. 1 is a diagram illustrating the structure of an AE source location apparatus that is an embodiment of the present invention.

In FIG. 1, reference numeral 1 denotes a signal source location apparatus and 2 a test bearing, which in the illustrated example is a radial ball bearing. The test bearing 2 includes an inner ring 3, an outer ring 4 and balls 5. In this example, the number of balls is eight. The inner ring 3 has a mark 6. The signal source location apparatus 1 has a signal sensor 7, an inner ring position sensor 8 for measuring a rotational position of the inner ring 3, and a ball position sensor 11 for measuring ball revolution position, and a housing 12. The signal source location apparatus 1 also has an arithmetic unit 13 for calculating a position of contact between a ball 5 and inner ring 3 or outer ring 4 based on signals from the sensors 7, 8 and 11. The inner ring position sensor 8 is fixed on axis OY in opposition to the mark 6. The ball position sensor 11 is fixed at a clockwise angle $\phi$ relative to the OY axis to enable revolutions of the balls 5 to be detected. The signal sensor 7 is for detecting anomaly signals (AE, vibration, sounds) from the bearing. An AE sensor is used for AE, a vibration acceleration sensor or vibration velocity sensor is used for vibrations, and a microphone is used for sounds.

Figure 2:
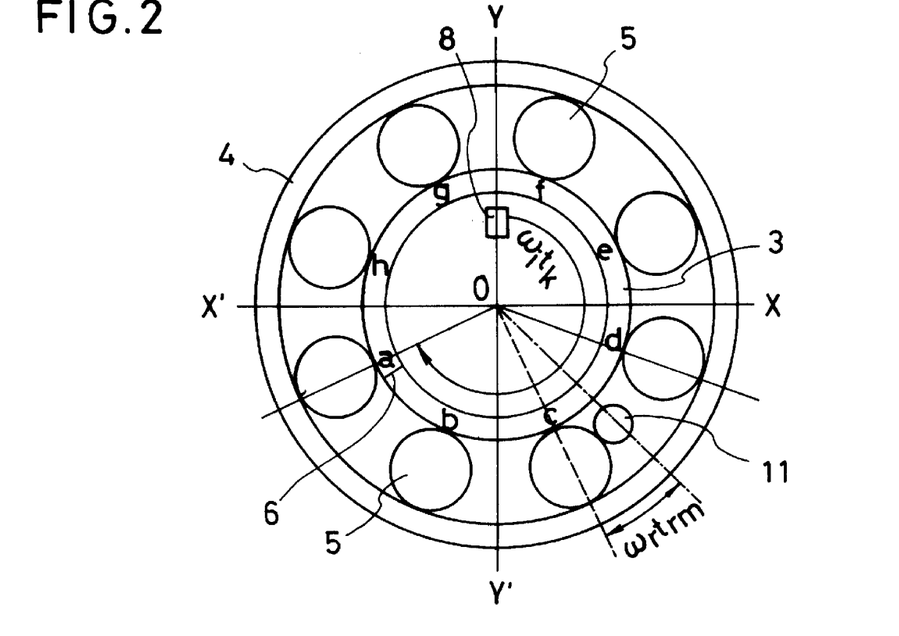
FIG. 2 illustrates the state of a bearing that has emitted an AE at an inner ring elapsed time $t_k=t_1$ and a ball elapsed time $tr_m=tr_1$.

In the signal source position location apparatus 1, signal source position location is effected by the following operation. As shown in FIG. 1, a load is imposed upward on the bearing 2 along line Y-Y', inducing a load zone within the range $2\theta$ in which there are three balls 5. With reference to FIG. 2, if the test bearing 2 is rotating at an angular velocity $\omega_i$ and a signal (AE or vibration) is generated at a time $t_k=t_1$ after inner ring position sensor 8 detects the inner ring mark 6, it can mean that either the inner ring 3 or outer ring 4 of the bearing 2 has suffered damage. In this case the signal source location is limited to load zone $2\theta$, and the location $\alpha$ of the inner ring mark 6 is $$\alpha = \omega_i \cdot t_1 \quad (1)$$

Also, inner ring signal source region $\beta$ of a ball 5 relative to the mark 6 is at $$180° - \omega_i \cdot t_1 - \theta \leq \beta \leq 180° - \omega_i \cdot t_1 + \theta \quad (2)$$

Here, for upper and lower limit values, the direction of rotation relative to the mark 6 is taken as positive and the reverse direction as negative. Also, if a ball 5 is taken as passing in front of ball position sensor 11 at a revolution velocity $\omega_r$, the position $\tau$ of the ball after $t_{rm}=t_{rl}$ will be $$\tau = \omega_r \cdot t_{rl} + n \cdot 360/z + \phi \quad (3)$$

Here, n is an integer within $-1 \leq n \leq z/2-1$, and z is the number of balls. A possible AE source position is every point of contact with a ball 5 within the load zone, so points along the inner ring that satisfy equations (1) to (3) are a, b and c (FIG. 2).

Figure 4:
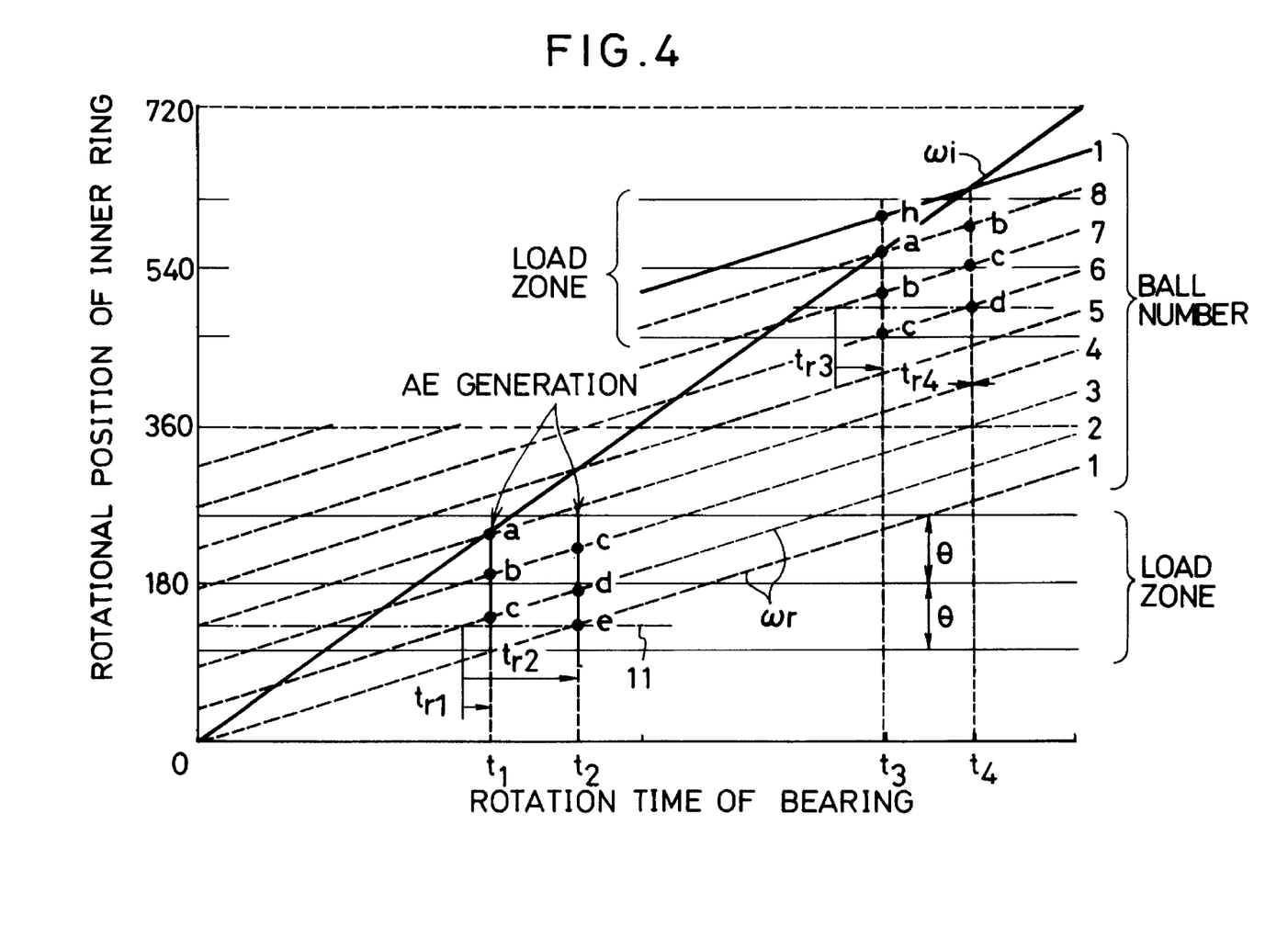
FIG. 4 is a chart illustrating the relationship between the rotational position of the inner ring and the revolution position of balls in the bearing of FIGS. 2 and 3.
Figure 5A:
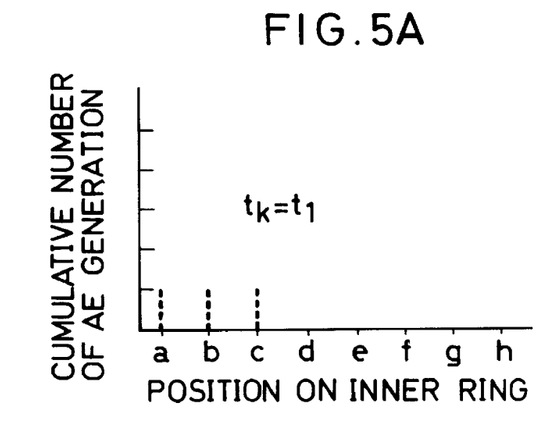
FIG. 5(a) is a graph showing the process of locating an inner ring signal source position at an initial AE generation time $t_1$ with reference to FIG. 4.
Figure 5B:
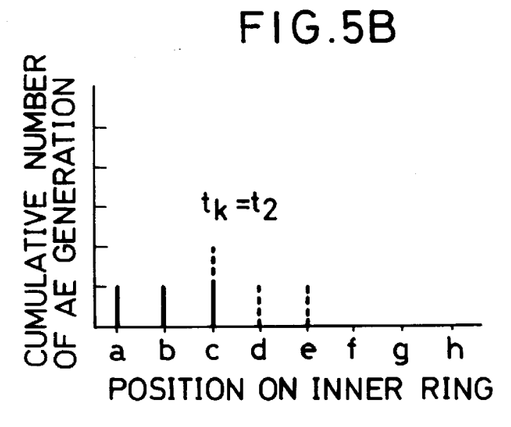
FIG. 5(b) is a graph showing the process of locating an inner ring signal source position at the next AE generation time $t_2$ with reference to FIG. 4.
Figure 5C:
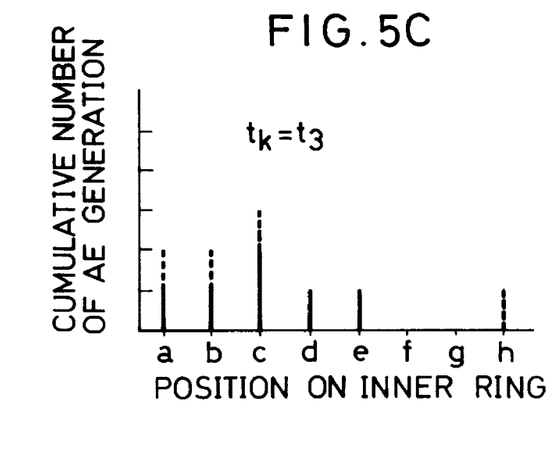
FIG. 5(c) is a graph showing the process of locating an inner ring signal source position at AE generation time $t_3$ with reference to FIG. 4.
Figure 5D:
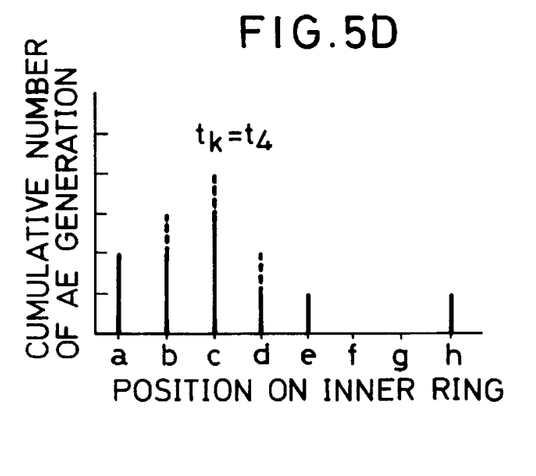
FIG. 5(d) is a graph showing the process of locating an inner ring signal source position at AE generation time $t_4$ with reference to FIG. 4.

Assuming the signal source position is c, the chart of FIG. 4 shows the points of contact between the balls 5 and inner ring 3 during two revolutions of the inner ring 3. In FIG. 4, the horizontal axis represents the rotation time of the test bearing and the vertical axis represents the angle of rotation of the inner ring and the angle of revolution of the balls. The solid line $\omega_i$ indicates the rotational angle of the mark 6 on the inner ring 3 and the broken line $\omega_r$ and the group of lines parallel thereto indicate the motion of ball number one and the revolution of other balls. If an AE is generated at $t_k=t_1$, the region along the track of inner ring 3 obtained from equation (2) is in the load zone. The positions of balls 5 can be obtained from equation (3). Here, points of contact a, b and c between balls number four, three and two and the inner ring form possible signal source positions. $t_k=t_1$ of equation (3) is an elapsed time as measured from when the mark 6 on the inner ring 3 passes in front of the inner ring position sensor 8. In contrast, $t_{rm}=t_{rl}$ of equation (3) is as elapsed time as measured from the time that ball 5, namely number two ball 5, passes in front of the ball position sensor 11 to the time at which the signal is generated. In the chart, the single-dot chain line indicates the position of the ball position sensor 11.

Figure 3:
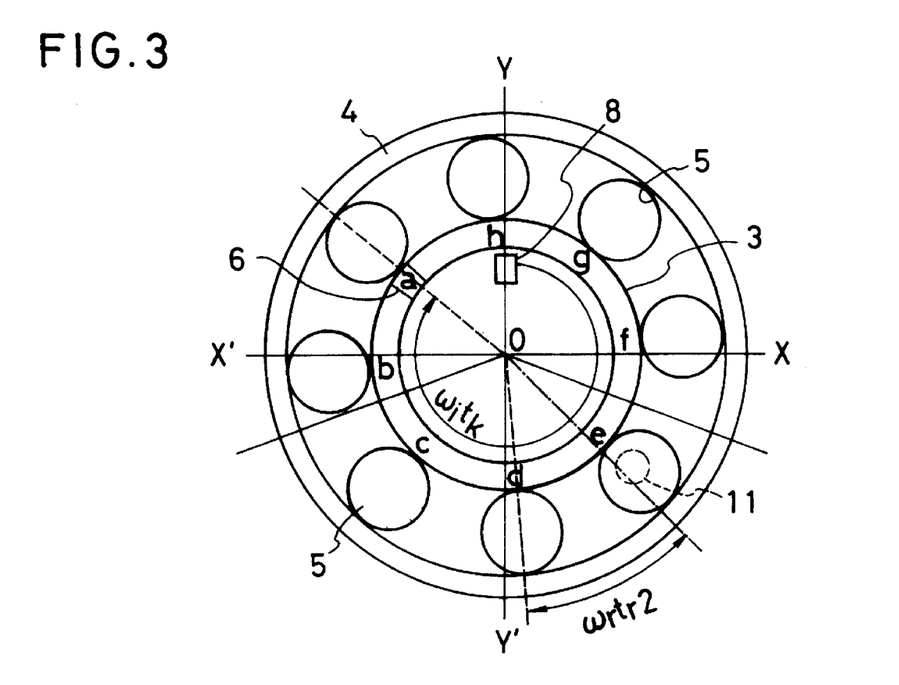
FIG. 3 illustrates the state of a bearing that has emitted an AE at an inner ring elapsed time $t_2$ and a ball elapsed time $tr_2$.

With reference to FIG. 3, if a signal is again generated at the elapsed time $t_k=t_2$ after inner ring mark 6 is detected by the inner ring position sensor 8, as in the preceding manner, $t_2$ is measured. Since number one ball 5 has not passed the ball position sensor 11, $t_{r2}$ can be obtained using number two ball 5 as a reference point. Signal generation times $t_3$ and $t_4$ on the second rotation can be obtained as times elapsed from the second time the inner ring mark 6 passes the inner ring position sensor 8. $t_{r3}$ and $t_{r4}$ are measured as the time elapsed from the passage of balls number seven and six in front of the ball position sensor 11.

Figure 6:
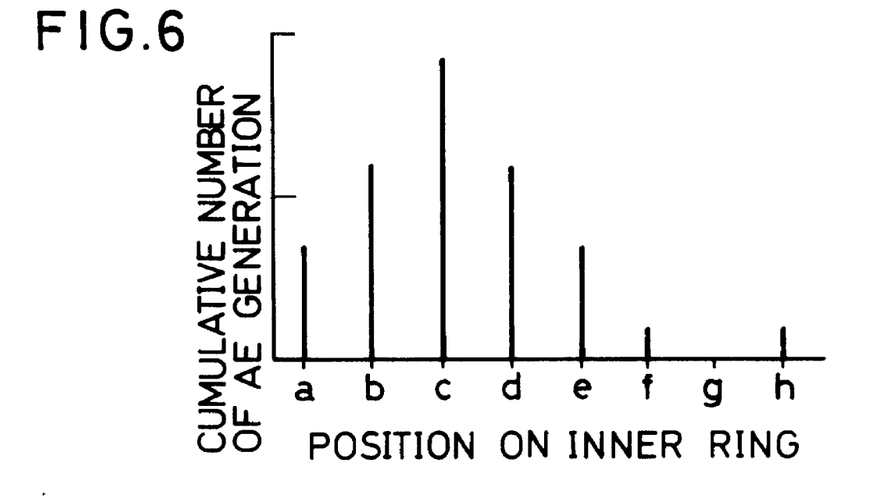
FIG. 6 is a graph showing the result of a location of an inner ring AE source position when inner ring rotation is continued.

The results of these measurements are used as a basis to locate possible signal source positions, as shown in FIG. 5. In FIG. 5 the horizontal axis represents positions on the inner ring 3 and the vertical axis represents the cumulative number of signals. With reference to FIG. 5(a), at time $t_k=t_1$, a signal is generated by the contact of balls 5 at points a, b and c at intervals of 45° along the inner ring 3 (when z =8), whereby the signal is incremented by one at each position, as shown by FIG. 5(a). Next, at $t_k=t_2$, when a signal is generated balls 5 are in contact with the inner ring 3 at points c, d and e, and the signal is incremented by one at each position, as shown by FIG. 5 (b). Location proceeds in the same way with reference to $t_3$ and $t_4$, as shown by FIGS. 5(c) and 5(d). Thus, up to $t_4$, the highest peak is described at point c on the inner ring 3. FIG. 6 is a histogram based on numerous signals generated by continued rotation of the inner ring 3. Inner ring position c, corresponding to the highest peak in FIG. 6, is decided as the actual signal source position. When the radial clearance is small enough to be ignored and there is no slip between the inner ring 3 and the balls 5, the relationship between velocities $\omega_r$ and $\omega_i$ is as follows.

$$\omega_r = \omega_i \cdot (R/(2R+D)) \quad (4)$$

where R is the radius of the groove of the inner ring and D is ball diameter.

Figure 7:
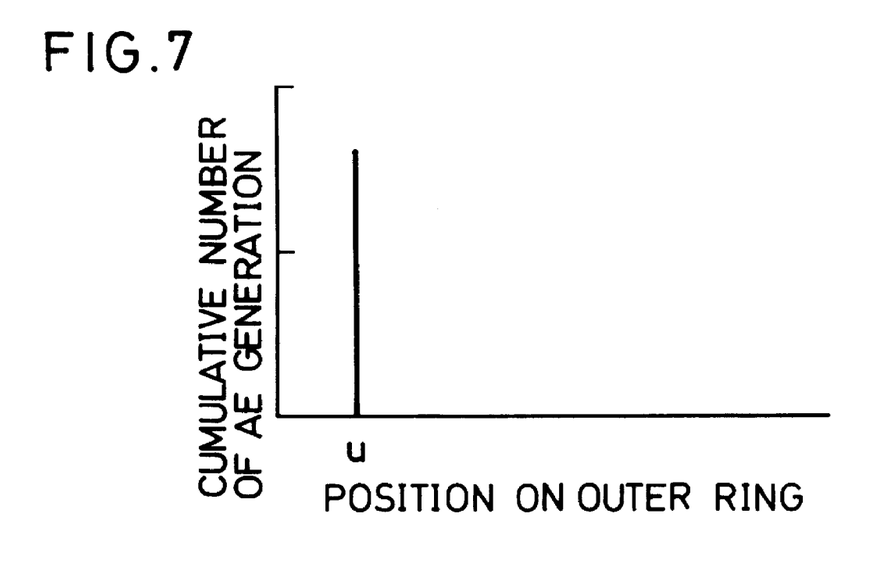
FIG. 7 is a graph showing the result of a location of an outer ring AE source position.

Location of signal source position on the outer ring 4 will now be described. Signal source position on the outer ring 4 is obtained from the product of $t_{rm}$, as the time that elapses between when a ball 5 passes in front of the ball position sensor 11 and when a signal is emitted, and ball revolution velocity $\omega_r$. When a signal is generated at position u on the track of the outer ring 4, the result of the location of the signal source position is a single peak, as in the histogram shown in FIG. 7.

A computer simulation of AE position location was performed, using the conditions listed in Table 1.

TABLE 1

| | |
|---|---|
| Test bearing | Deep-groove ball bearing: 6204 |
| Test conditions | Load: 1290N |
| | Speed: 2520 rpm |
| | Rotation period: 10 s |
| Location conditions | No. of inner ring divisions: 82 |
| | No. of outer ring divisions: 17 |

For locating the source position of an AE, the track of the inner ring was divided into 82 equal sections and each section was assigned an address. With respect to the outer ring, based on an assumption that the AE would arise within 45° to each side of the point of maximum rolling element load, the AE was obtained by dividing the outer ring into 17 sections and assigning an address to each section. Therefore, the location result with respect to the outer ring was the result of the location of the actual AE source position and a position displaced by 45° therefrom. The resolution of the positional location was within about 1 mm, with respect to both the inner ring and the outer ring. Under the above load conditions, the load zone was 72.6° to each side of the point of maximum rolling-element load.

Figure 8:
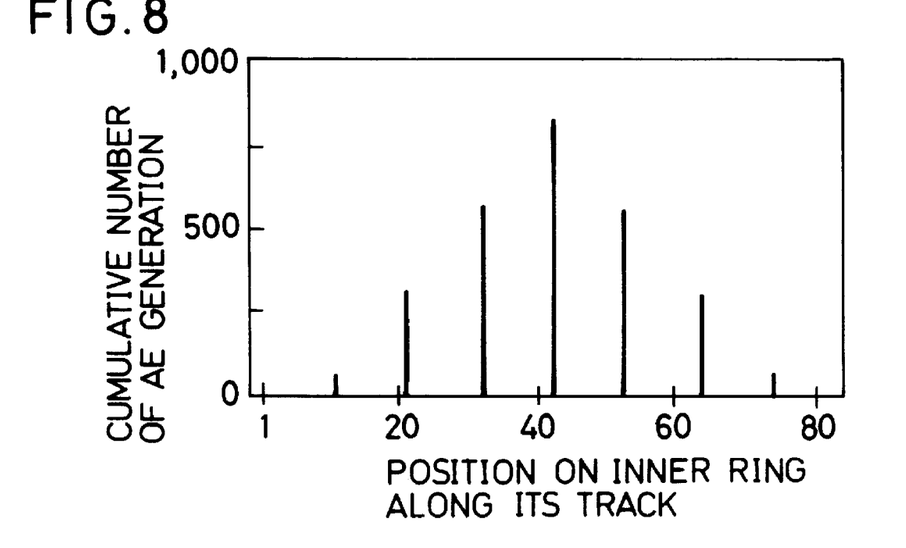
FIG. 8 is a graph showing the result of a simulated location of an inner ring AE generation.

As in the arrangement of FIG. 1, the inner ring position sensor 8 was fixed on axis OY and the ball position sensor 11 was fixed clockwise from the axis OY at φ=135°. FIG. 8 shows the results of the simulation. It is assumed here that the source of the AE was at address 42 of the inner ring 3. In FIG. 8, the highest peak appears at address 42, and with that as the center, the other peaks appear at an equal spacing that corresponds to the spacing of the balls.

Figure 9:
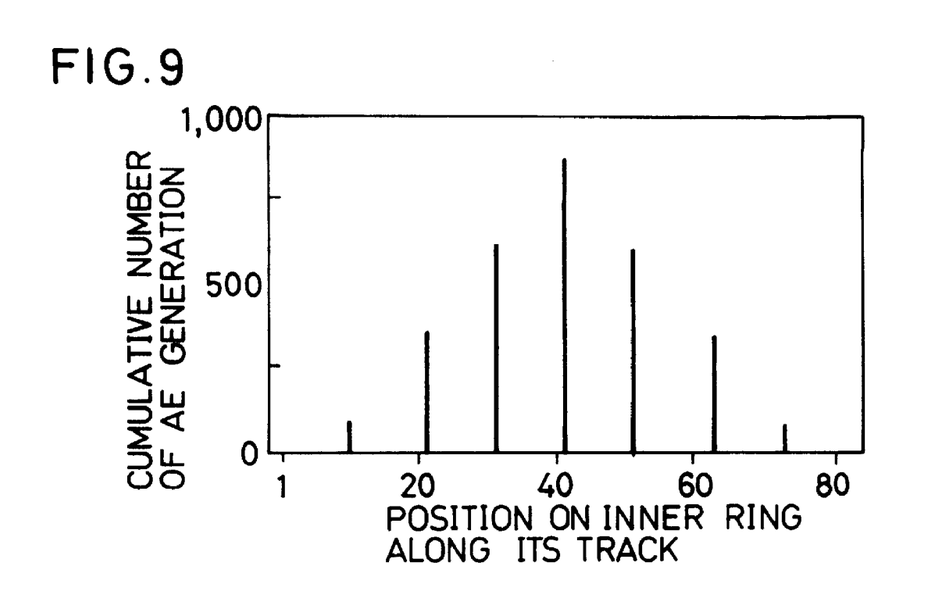
FIG. 9 is a graph showing the result of a simulation of an AE produced by an inner ring and a ball during the same period.

FIG. 9 shows the results of locations of AE source position when the AE were generated at one ball and address 42 of the inner ring 3 in the same period. An AE generated by a ball is not synchronous with the position in the inner ring 3, so the AE is located as being generated at all positions along the inner ring 3. Thus, compared to when an AE is generated by just the inner ring in FIG. 8, there is the addition of what appear to be ball-based AE events generated at all positions of the inner ring 3.

An experimental example of the method for locating the source of a signal according to the invention will now be discussed. The test bearing used in the experiment was the same type used in the simulation, a deep-groove ball bearing 6204 (with an inner diameter of 20 mm, an outer diameter of 47 mm, a width of 14 mm and eight balls, manufactured by Koyo Seiko Company of Japan). The inner ring was machined beforehand to occur spalling. The test bearing was subjected to a load designed to induce a maximum contact stress of 6.51 GPa on the contact area between inner ring and balls. The angle of the load zone was approximately 75°. The rotational speed of the inner ring was 2520 rpm, and for lubrication the bearing was supplied with ISO VG 46 lubricating oil. For the experiment, the vibration acceleration was measured constantly and set to stop if the root mean square value exceeded 7.8 m/s².

Figure 10:
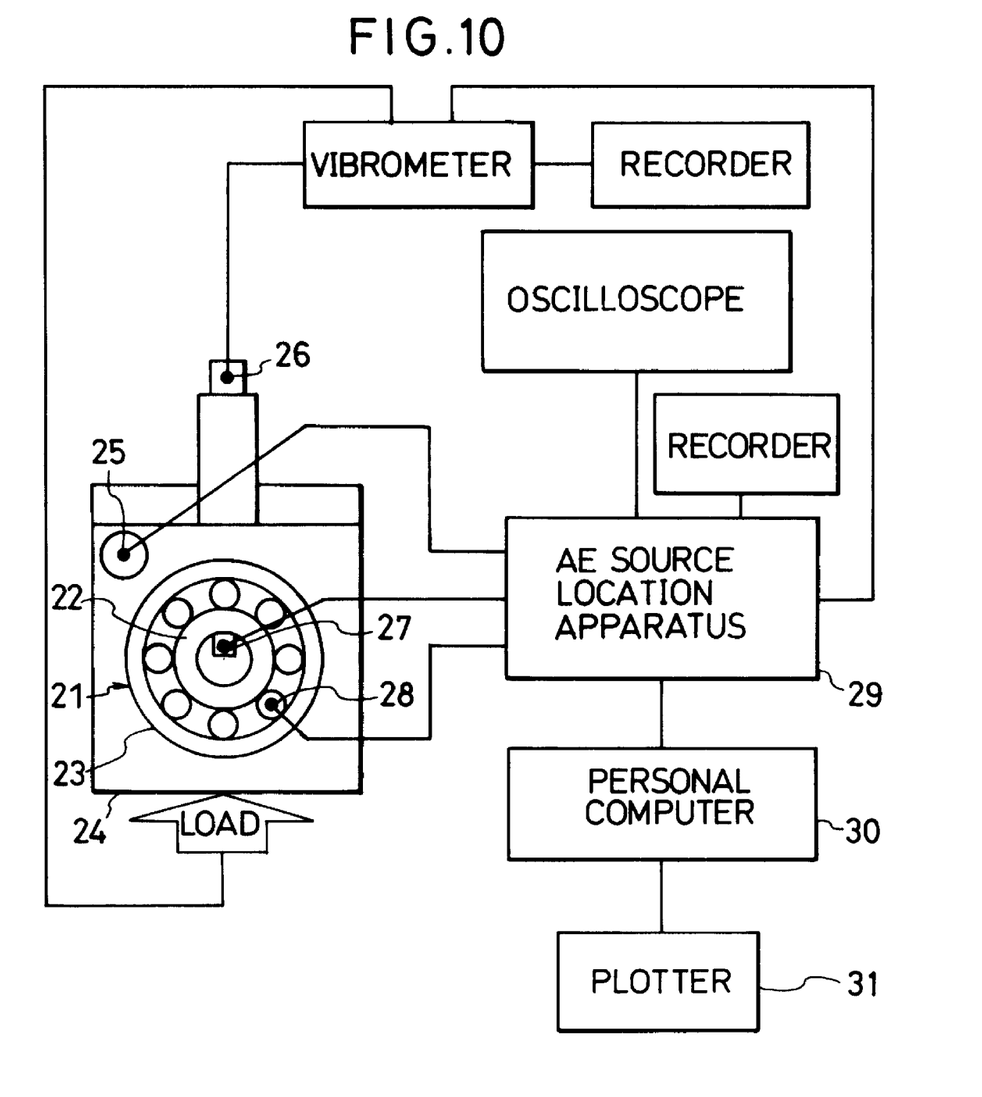
FIG. 10 is a diagram illustrating the structure of a location apparatus that is an embodiment of the present invention.

FIG. 10 illustrates the arrangement of the system used to measure AE/vibration in the bearing testing machine used in the experiment. An AE sensor 25 and a vibration acceleration pickup 26 are attached to a housing 24 of the test bearing 21. For AE source location, a positional detection sensor 27 for the inner ring 22 is attached to a housing (not shown) that supports the main shaft of the testing machine and a ball positional detection sensor 28 is attached to the test-bearing housing 24.

Location of source position of AE events generated at the inner ring 22 is performed by AE source location apparatus 29 based on signals from the sensors 25, 27 and 28. AE events generating at outer ring 23 are located by the apparatus 29 based on signals from the sensors 25 and 28. The results of the location are input to a personal computer 30 and can be viewed on a CRT and output by a plotter 31.

AE measurement conditions for the above experiment are listed in Table 2.

TABLE 2

| | |
|---|---|
| Amplification (first stage) | 40 dB |
| Amplification (main) | 30 dB |
| Filter | 200–400 kHz bandpass filter |
| Envelop time | 1 msec |
| Threshold value | 1.00 V |
| Duration | 0.2–3 msec |

Figure 11A:
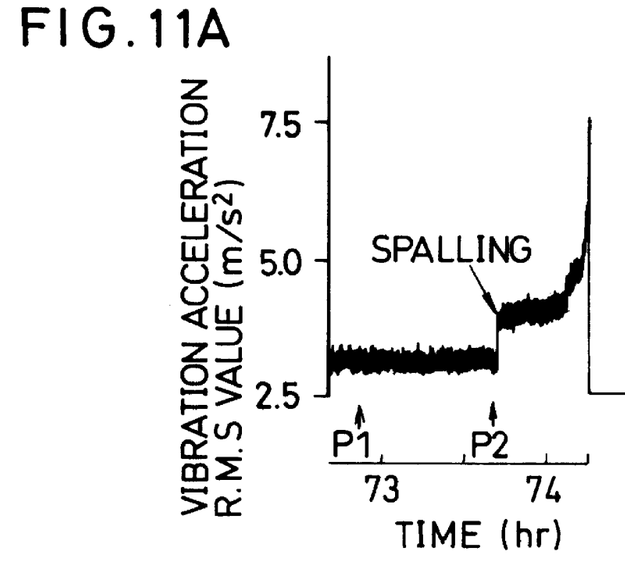
FIG. 11(a) is a graph showing time-based changes in vibration acceleration r.m.s. (root mean square) values obtained under test.
Figure 11B:
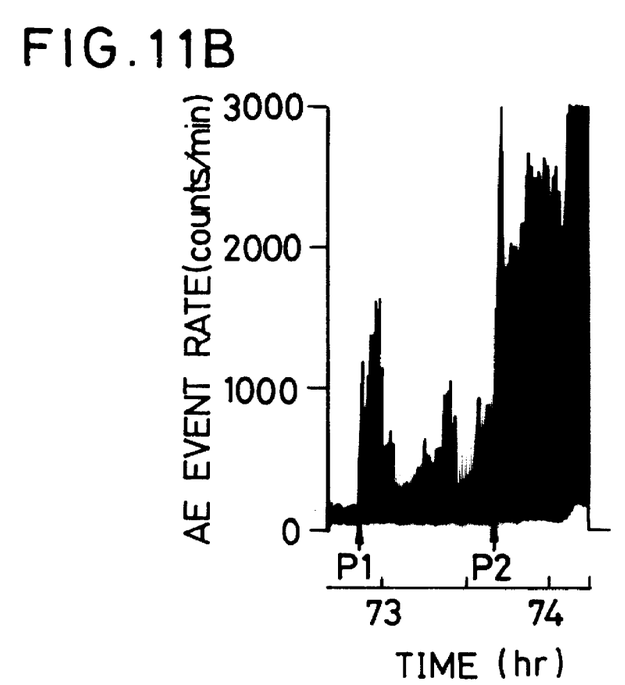
FIG. 11(b) is a graph showing time-based changes in AE event rate obtained under test.

The graphs of FIG. 11 show the results of the experiment. Namely, FIG. 11(a) shows a trend of r.m.s. (root mean square) vibration acceleration values and FIG. 11(b) shows a trend of the AE event rate. In FIG. 11(b), the height of a line represents the number of AE events in one minute. The horizontal axis of each graph represents elapsed time. The r.m.s. vibration acceleration value represents the energy of the vibration acceleration component; spalling caused by rolling contact fatigue in the bearing results in a marked increase in this value. The AE event rate represents the number of AE events generated per unit time. A high AE event rate indicates marked generation or propagation of fatigue crack.

A small spalling occurred in the surface of the inner ring at point $P_2$, after 73.5 h of the experiment. FIG. 11(a) shows the increase in vibration indicated by a sudden sharp rise in the r.m.s. vibration acceleration value (indicated by the arrow) at the occurrence of the spalling. As can be seen, the experiment was terminated after 74.25 hours when the r.m.s. vibration acceleration value exceeded 7.8 m/s². As shown by the AE event rate in FIG. 11(b), there were almost no AE events before 73 hours of the experiment, the AE rate rose near the 73-hour mark ($P_1$), and showed a sharp increase from $P_2$ where spalling occurred.

Figure 12A:
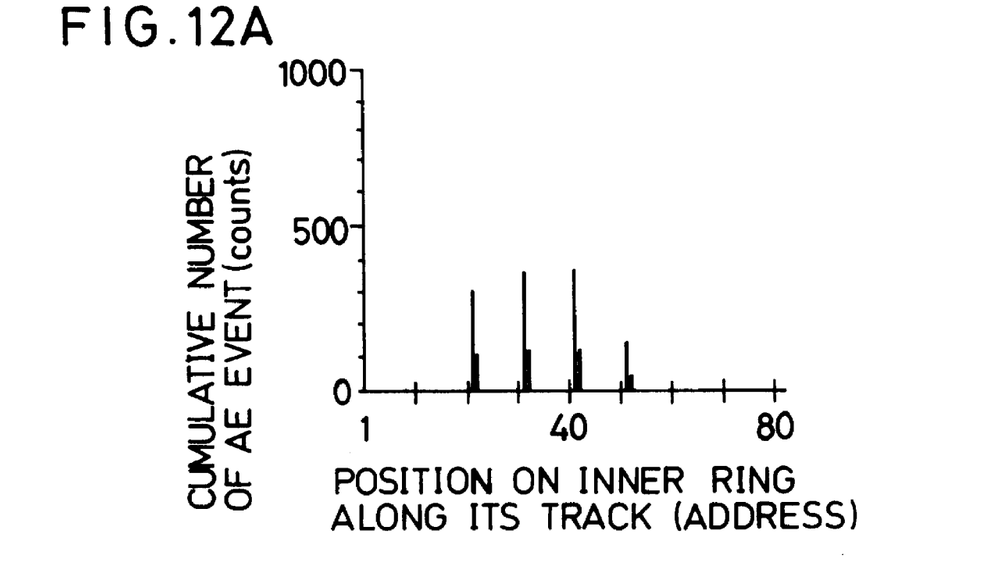
FIG. 12(a) is a graph showing the result of a five-minute-period location of AE source position that includes point $P_1$ of FIG. 11.
Figure 12B:
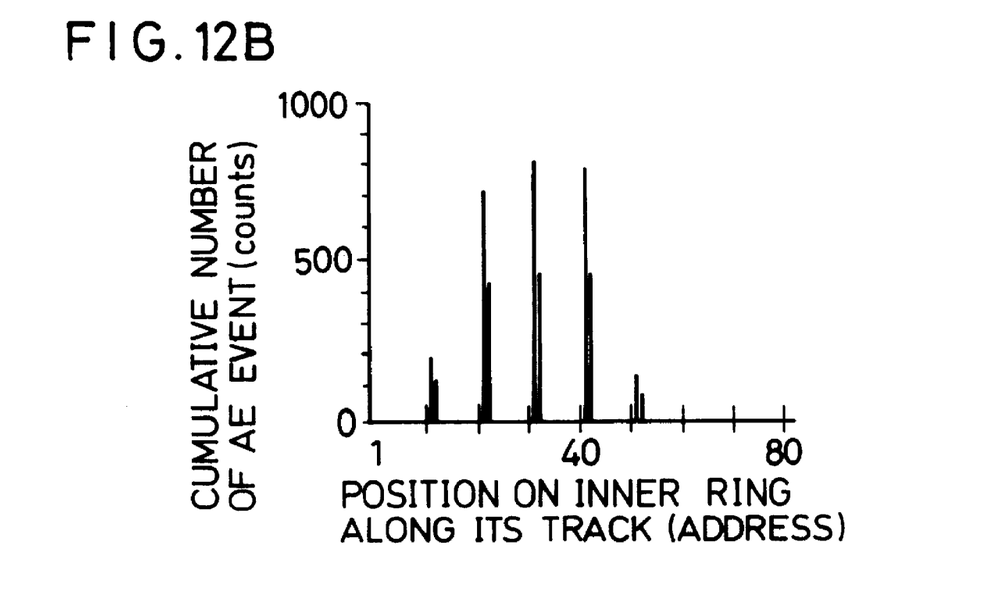
FIG. 12(b) is a graph showing the result of a five-minute-period location of AE source position that includes point $P_2$ of FIG. 11.

During the experiment, location of AE source position was carried out while measuring the AE event rate and the r.m.s. vibration acceleration value. The results are as shown by the graphs of FIG. 12. In these graphs, the horizontal axis represents the address assigned to each of 80 equal sections into which the track of the inner ring was divided, while the vertical axis represents the cumulative number of AE events that take place at each address in a 5-minute period. FIG. 12(a) shows the AE source location results for a 5-minute period that includes time point $P_1$. Four peaks were observed, one every ten addresses, starting from address 21, with the highest peaks being at addresses 31 and 41. FIG. 12(b) shows the AE source location results for a 5-minute period that includes time point $P_2$. Peaks were observed every ten addresses, from address 11 to address 51, with the highest peak being at address 31. The source location results for the period $P_1$ to $P_2$ formed histograms in close agreement with FIG. 12(b). This is because the test bearing that produced a peak every ten addresses in FIG. 12 composed of eight balls arranged equidistantly around the periphery of the inner ring, so when an AE event took place, within the load zone all points along the track of the inner ring where there is contact with balls constitute possible AE source positions.

Figure 13:
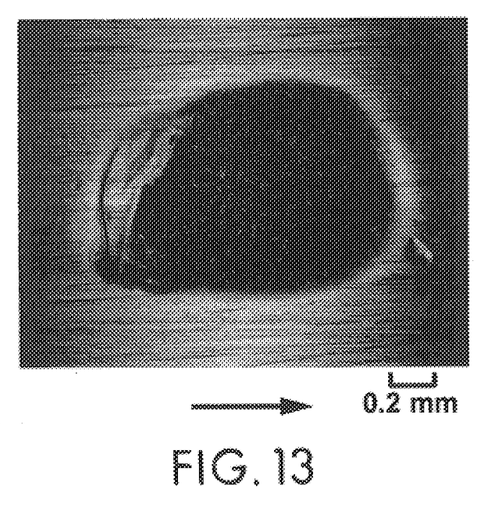
FIG. 13 is a photograph showing spalling occurred in the inner ring under test.

FIG. 13 is a photograph showing spalling taking place on the inner ring during the experiment. The arrow below the photograph indicates the direction of rotation of the ball.

Figure 14:
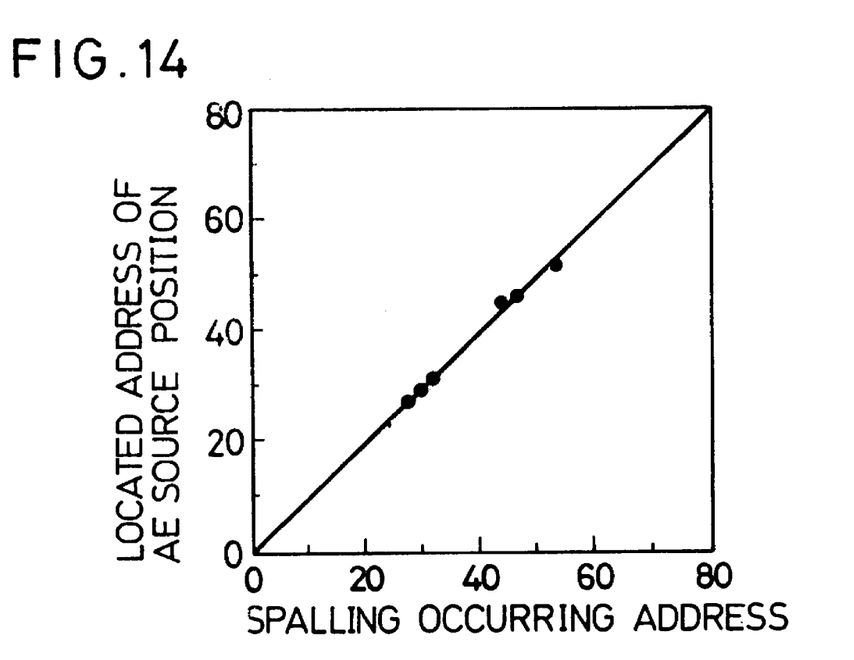
FIG. 14 is a graph showing the correlation between located address of AE source position and spalling address obtained with seven tests.

When the position of the spalling was measured, it was found to coincide with the position of the highest peak at address 31 in FIG. 12(*b*). Based on the above result, with reference to FIG. 11(*b*), all events taking place subsequent to point $P_1$ can be described as being associated with the propagation of fatigue crack occurring at address 31. The experiment was conducted seven times, and the correlation between the located address of AE source position and the address at which spalling occurred was investigated. The results are shown in FIG. 14. Based on the spread of experimental plots in the vicinity of the straight line at 45° at which the correlation coefficient is 1, it was confirmed that this location method has high reproducibility and precision.

In accordance with this invention, by locating the signal source position as the point at which the contact occurs between a ball and the inner or outer ring when the signal is emitted, by taking into account the state of contact of parts within the rolling bearing, the signal measurement system can be effected using only a single channel, and with improved location sensitivity and precision. This radial bearing abnormality diagnosis enables anomalous states to be accurately ascertained as positional information, and also enables a method and apparatus to be obtained for locating the position of a signal source in a radial bearing with an improved S/N ratio. Moreover, while the above description has mainly been with respect to the invention applied to ball-bearings for supporting purely radial loads, the invention can also be applied to radial bearings that take composite loads.

What is claimed is:

1. An apparatus for locating a source position of an anomalous signal in a radial bearing that includes an inner ring, an outer ring coaxial with the inner ring, and a plurality of balls between the inner ring and the outer ring, said apparatus comprising:
    (a) a track of at least one of the inner ring and outer ring divided into a predetermined number of equal sections;
    (b) an inner-ring positional detection sensor to detect a rotational position of the inner ring;
    (c) a ball positional detection sensor to detect a revolution position of the balls;
    (d) a signal detection sensor to detect an anomalous signal generated from the radial bearing;
    (e) an arithmetic unit to calculate positions of contact between the balls and the inner or outer ring from outputs from said inner-ring positional detection sensor and said ball positional detection sensor when said signal detection sensor detects said anomalous signal; and
    (f) means for locating as an anomalous signal source position one of said predetermined number of equal sections from which a largest number of anomalous signals are generated.

2. The apparatus of claim 1, wherein the inner ring is divided into 82 equal sections and the outer ring is divided into 17 equal sections.

3. A method for locating a source position of an anomalous signal in a radial bearing that includes an inner ring, an outer ring coaxial with the inner ring, and a plurality of balls between the inner ring and the outer ring, said method comprising the steps of:
    (a) dividing a track of at least one of the inner ring and outer ring into a predetermined number of equal sections;
    (b) using an inner-ring positional detection sensor to detect a rotational position of the inner ring;
    (c) using a ball positional detection sensor to detect a revolution position of the balls;
    (d) using a signal detection sensor to detect an anomalous signal generated from the radial bearing;
    (e) using an arithmetic unit to calculate positions of contact between the balls and the inner or outer ring from outputs from said inner-ring positional detection sensor and said ball positional detection sensor when said signal detection sensor detects said anomalous signal; and
    (f) locating as an anomalous signal source position one of said predetermined number of equal sections from which a largest number of anomalous signals are generated.

4. The method of claim 3, wherein the dividing step divides the inner ring into 82 equal sections and divides the outer ring into 17 equal sections.

5. The method of claim 3, wherein the step (f) locates said one of said predetermined number of equal sections by forming a histogram of said calculated positions from the step (e).

6. The method of claim 4, wherein the step (f) locates said one of said predetermined number of equal sections by forming a histogram of said calculated positions from the step (e).

7. The method of claim 3, wherein the inner-ring positional detection sensor is fixed on a predetermined axis and the ball positional sensor is fixed clockwise 135° from the predetermined axis.

8. The method of claim 4, wherein the inner-ring positional detection sensor is fixed on a predetermined axis and the ball positional sensor is fixed clockwise 135° from the predetermined axis.

9. The method of claim 5, wherein the inner-ring positional detection sensor is fixed on a predetermined axis and the ball positional sensor is fixed clockwise 135° from the predetermined axis.

10. The method of claim 6, wherein the inner-ring positional detection sensor is fixed on a predetermined axis and the ball positional sensor is fixed clockwise 135° from the predetermined axis.

11. The apparatus of claim 1, wherein the means locates said one of said predetermined number of equal sections by forming a histogram of said calculated positions.

12. The apparatus of claim 2, wherein the means locates said one of said predetermined number of equal sections by forming a histogram of said calculated positions.

13. The apparatus of claim 1, wherein the inner-ring positional detection sensor is fixed on a predetermined axis and the ball positional sensor is fixed clockwise 135° from the predetermined axis.

14. The apparatus of claim 2, wherein the inner-ring positional detection sensor is fixed on a predetermined axis and the ball positional sensor is fixed clockwise 135° from the predetermined axis.

15. The apparatus of claim 11, wherein the inner-ring positional detection sensor is fixed on a predetermined axis and the ball positional sensor is fixed clockwise 135° from the predetermined axis.

16. The apparatus of claim 12, wherein the inner-ring positional detection sensor is fixed on a predetermined axis and the ball positional sensor is fixed clockwise 135° from the predetermined axis.

* * * * *

UNITED STATES PATENT AND TRADEMARK OFFICE
CERTIFICATE OF CORRECTION

PATENT NO. : 5,811,683
DATED : SEPTEMBER 22, 1998
INVENTOR(S) : TAKEO YOSHIOKA ET AL

It is certified that error appears in the above-identified patent and that said Letters Patent is hereby corrected as shown below:

In FIG. 1, change reference numeral "20" to --2θ--.

Signed and Sealed this

Twelfth Day of September, 2000

Attest:

Attesting Officer

Q. TODD DICKINSON

*Director of Patents and Trademarks*